(12) United States Patent
Timken et al.

(10) Patent No.: US 8,586,812 B2
(45) Date of Patent: *Nov. 19, 2013

(54) IONIC LIQUID CATALYZED OLEFIN OLIGOMERIZATION FOR DISTILLATE PRODUCTION

(75) Inventors: Hye-Kyung C. Timken, Albany, CA (US); Bi-Zeng Zhan, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/975,750

(22) Filed: Dec. 22, 2010

(65) Prior Publication Data

US 2012/0165586 A1 Jun. 28, 2012

(51) Int. Cl.
  *C07C 2/26* (2006.01)
  *C07C 2/34* (2006.01)
(52) U.S. Cl.
  USPC ............ 585/511; 585/520; 585/530; 208/78; 208/80; 208/85; 208/92; 208/106; 208/107; 208/113
(58) Field of Classification Search
  None
  See application file for complete search history.

(56) References Cited

U.S. PATENT DOCUMENTS

| 6,605,206 | B1 * | 8/2003 | Johnson et al. | 208/80 |
| 7,572,943 | B2 * | 8/2009 | Elomari et al. | 585/332 |
| 7,576,252 | B2 * | 8/2009 | Elomari et al. | 585/722 |
| 2001/0004972 | A1 * | 6/2001 | Miller et al. | 208/18 |
| 2006/0149107 | A1 * | 7/2006 | Harris et al. | 585/518 |
| 2009/0264694 | A1 * | 10/2009 | Driver et al. | 585/713 |
| 2009/0306444 | A1 | 12/2009 | Elomari et al. | |
| 2010/0108568 | A1 * | 5/2010 | De Klerk | 208/58 |
| 2010/0147746 | A1 | 6/2010 | Driver et al. | |

OTHER PUBLICATIONS

Hydrocracking, SET Laboratories Inc., 2008, pp. 1 http://www.setlaboratories.com/hydrocra/tabid/105/Default.aspx.*
PCT Search Report and Written Opinion of the International Searching Authority, PCT/US2011/044140, Mar. 21, 2012.

* cited by examiner

*Primary Examiner* — Walter D Griffin
*Assistant Examiner* — Jelitza Perez
(74) *Attorney, Agent, or Firm* — Susan M. Abernathy; Steven H. Roth

(57) ABSTRACT

Processes for upgrading condensate in a first hydrocarbon stream to provide distillate material may involve ionic liquid catalyzed olefin oligomerization of olefins in the first hydrocarbon stream to provide a first distillate enriched stream, dechlorination of the first distillate enriched stream, hydroprocessing at least one of a second and a third hydrocarbon stream to provide a second distillate enriched stream, and separation of a distillate product from the first and second distillate enriched streams.

26 Claims, 3 Drawing Sheets

US 8,586,812 B2

IONIC LIQUID CATALYZED OLEFIN OLIGOMERIZATION FOR DISTILLATE PRODUCTION

TECHNICAL FIELD

The present invention relates to ionic liquid catalyzed olefin oligomerization for distillate production.

BACKGROUND

As the world's supply of crude oil dwindles, processes such as Fisher-Tropsch synthesis and coal-to-Liquid (CTL) may become more economically viable, and increased usage of these technologies has been proposed. Both Fisher-Tropsch and coal-to-liquid processes generate substantial amounts of light condensate streams rich in olefins. As the demand for jet fuel and diesel fuel increases, there is more interest in converting the light condensate streams into distillate range products, particularly for jet fuel, diesel fuel, and lube base stock. However, conventional processes offer only limited options for upgrading the condensate into distillate or lube base stock range products.

In general, oligomerization reactions have been applied widely in the chemical and petroleum industries, including olefin oligomerization for the conversion of olefins to heavier products. With respect to applications for upgrading condensate, zeolite based catalysts have failed to achieve high conversion of olefins. In addition, zeolite based catalysts do not provide high levels of selectivity towards distillate range material, having a tendency to make lighter (less valuable) products. Furthermore, zeolite based catalysts for olefin conversions are prone to fairly rapid deactivation, while an alternative $H_3PO_4$ based oligomerization process tends to provide low quality products.

It can be seen that there is a need for improved processes for condensate upgrading that provide higher rates of olefin conversion into distillate, improved selectivity, and steady state catalytic activity for extended periods.

SUMMARY

Figure 1:
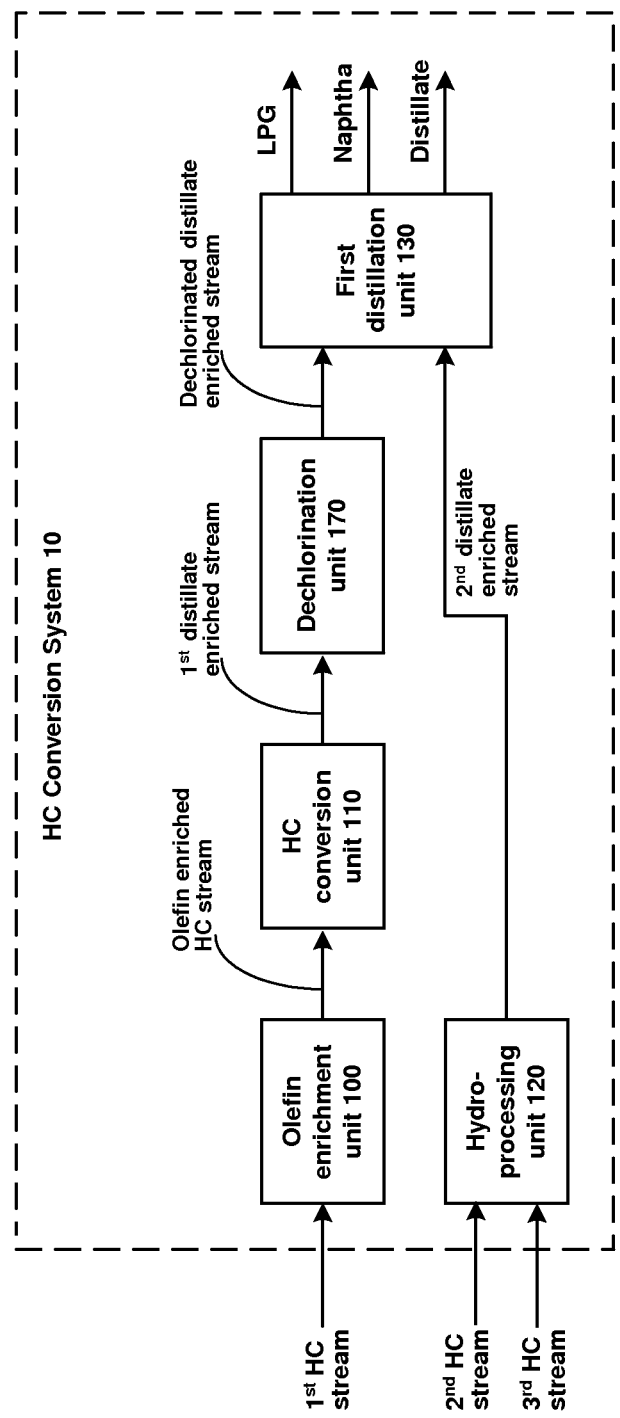
FIG. 1 represents a scheme for an ionic liquid catalyzed hydrocarbon conversion process using an oxygenate containing hydrocarbon feed, according to an embodiment of the present invention.

According to one aspect of the present invention there is provided an olefin oligomerization process comprising contacting a first hydrocarbon stream comprising $C_2$-$C_8$ olefins with an ionic liquid catalyst in a hydrocarbon conversion zone under oligomerization conditions to oligomerize the olefins and to provide a first distillate enriched stream including one or more halogenated components, and removing the one or more halogenated components from the first distillate enriched stream to provide a dechlorinated distillate enriched stream.

In another embodiment, the present invention further provides an olefin oligomerization process comprising providing a first Fischer-Tropsch derived hydrocarbon stream comprising a $C_{8-}$ Fischer-Tropsch condensate comprising oxygenates; contacting the Fischer-Tropsch condensate with a dehydration catalyst in a dehydration zone under oxygenate dehydrating conditions to convert at least a portion of the oxygenates in the Fischer-Tropsch condensate to olefins and to provide an olefin enriched Fischer-Tropsch condensate; contacting the olefin enriched Fischer-Tropsch condensate with an ionic liquid catalyst in an oligomerization zone under oligomerization conditions to oligomerize the olefins and to provide a first distillate enriched stream including one or more halogenated components; contacting the first distillate enriched stream with a hydrodechlorination catalyst in the presence of hydrogen in a hydrodechlorination zone under hydrodechlorination conditions to provide a dechlorinated distillate enriched stream; contacting at least one of a second Fischer-Tropsch derived hydrocarbon stream and a third Fischer-Tropsch derived hydrocarbon stream with a hydroprocessing catalyst in a hydroprocessing zone under hydroprocessing conditions to provide a second distillate enriched stream; feeding the second distillate enriched stream and the dechlorinated distillate enriched stream to a distillation unit; and via the distillation unit, separating a distillate product from at least one of the dechlorinated distillate enriched stream and the second distillate enriched stream.

As used herein, the terms "comprising" and "comprises" mean the inclusion of named elements or steps that are identified following those terms, but not necessarily excluding other unnamed elements or steps.

The term "Periodic Table" as referred to herein is the IUPAC version of the Periodic Table of the Elements dated Jun. 22, 2007, and the numbering scheme for the Periodic Table Groups is as described in Chemical and Engineering News, 63(5), 27 (1985).

The term "distillate" or "distillate product" as referred to herein, is a hydrocarbon product boiling in the range of 250° F.+(121° C.+).

DETAILED DESCRIPTION

According to one aspect of the present invention, oxygenate containing hydrocarbon streams may be upgraded to high value products using ionic liquid catalyzed processes. The oxygenate containing hydrocarbon streams may be pretreated in an olefin enrichment zone under olefin enrichment conditions to provide an olefin enriched hydrocarbon stream. In an embodiment, the present invention may find applications in upgrading olefins present in Fischer-Tropsch condensate, together with olefins formed by dehydration of oxygenate components of Fischer-Tropsch condensate, by olefin oligomerization.

In an embodiment, olefins in the olefin enriched hydrocarbon stream may undergo oligomerization when contacted with an ionic liquid catalyst to provide a first distillate enriched hydrocarbon stream. Ionic liquid catalyzed olefin oligomerization may take place under the same or similar conditions as ionic liquid catalyzed olefin/isoparaffin alkylation. As a result, in an embodiment of the present invention, both olefin oligomerization and olefin/isoparaffin alkylation may take place concurrently in a single hydrocarbon conversion zone. In another embodiment of the present invention, an oligomeric product formed in the hydrocarbon conversion zone may be subsequently alkylated by reaction with an isoparaffin in the same hydrocarbon conversion zone.

Ionic liquid catalyzed processes of the present invention, e.g., olefin oligomerization, may be performed in the presence of a co-catalyst or promoter to provide enhanced or improved catalytic activity. A co-catalyst according to the present invention may comprise, for example, anhydrous HCl or organic chloride (see, e.g., U.S. Pat. Nos. 7,495,144 to Elomari, and 7,531,707 to Harris et al., the disclosures of which are incorporated by reference herein in their entirety). When organic chloride is used as the co-catalyst with the ionic liquid, HCl may be formed in situ in the reactor during the hydrocarbon conversion process. Ionic liquid catalyzed hydrocarbon conversion products may include one or more halogenated components, as disclosed in commonly assigned co-pending patent application Ser. No. 12/847,313 entitled Hydrodechlorination of ionic liquid-derived hydrocarbon products, filed on Jul. 30, 2010, the disclosure of which is incorporated by reference herein in its entirety.

Products of ionic liquid catalyzed hydrocarbon conversion processes of the instant invention may be dechlorinated in a dechlorination zone, for example, by hot caustic treatment, by adsorption of organochlorine species using a suitable adsorbent, or by catalytic hydrodechlorination, to provide a dechlorinated distillate enriched stream. In an embodiment, catalytic hydrodechlorination may involve contacting the first distillate enriched stream with a hydrodechlorination catalyst in a hydrodechlorination zone in the presence of hydrogen at relatively low pressure. Products provided by the present invention will typically have a chloride content below levels specified for distillate fuels, such that products of the present invention may be blended into refinery product streams.

Ionic Liquid Catalysts

In an embodiment, processes according to the present invention may use a catalytic composition comprising at least one metal halide and at least one quaternary ammonium halide and/or at least one amine halohydride. The at least one metal halide may be selected from $AlCl_3$, $AlBr_3$, $GaCl_3$, $GaBr_3$, $InCl_3$, and $InBr_3$. The ionic liquid catalyst may comprise an alkyl substituted quaternary amine halide, an alkyl substituted pyridinium halide, or an alkyl substituted imidazolium halide of the general formula $N^+R_4X^-$. As non-limiting examples, ionic liquid catalysts useful in practicing the present invention may be represented by the general formulas A and B,

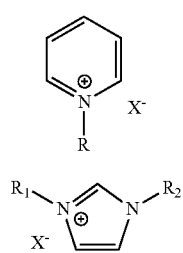

wherein R=H, methyl, ethyl, propyl, butyl, pentyl or hexyl, and X is a halide, and $R_1$ and $R_2$=H, methyl, ethyl, propyl, butyl, pentyl or hexyl, wherein $R_1$ and $R_2$ may or may not be the same. In an embodiment, X is chloride.

Quaternary ammonium halides which can be used in accordance with the present invention may include those described in U.S. Pat. No. 5,750,455, the disclosure of which is incorporated by reference herein. An exemplary metal halide that may be used for formulating an ionic liquid catalyst in accordance with the present invention is aluminum chloride ($AlCl_3$). In an embodiment, the ionic liquid catalyst may be a chloroaluminate ionic liquid prepared by mixing $AlCl_3$ and an alkyl substituted pyridinium halide, an alkyl substituted imidazolium halide, a trialkylammonium hydrohalide, or a tetraalkylammonium halide, as disclosed in commonly assigned U.S. Pat. No. 7,495,144, the disclosure of which is incorporated by reference herein in its entirety.

In a sub-embodiment, the ionic liquid catalyst may comprise N-butylpyridinium heptachlorodialuminate ionic liquid, which may be prepared, for example, by combining $AlCl_3$ with a salt of the general formula A, supra, wherein R is n-butyl and X is chloride. The present invention is not limited to any particular ionic liquid catalyst composition(s).

Ionic Liquid Catalyzed Hydrocarbon Conversion Systems and Processes

With reference to FIG. 1, an ionic liquid catalyzed hydrocarbon conversion system 10 for processing a plurality of hydrocarbon feeds for maximum distillate yield according to an embodiment of the present invention may include an olefin enrichment unit 100, a hydrocarbon conversion unit 110, a hydroprocessing unit 120, a dechlorination unit 170, and a first distillation unit 130.

With reference to FIG. 1, a first hydrocarbon stream may include substantial amounts of oxygenates. The first hydrocarbon stream may be treated in olefin enrichment unit 100 under olefin enrichment conditions, wherein oxygenates may be converted to olefins to provide an olefin enriched hydrocarbon stream. Olefin enrichment unit 100 may also be referred to herein as an olefin enrichment zone. The first hydrocarbon stream may typically comprise from about 0.5 to 30 wt % oxygenates.

In an embodiment, the oxygenate containing hydrocarbon stream may be enriched in olefins by converting the oxygenates in the stream to olefins. In an embodiment, oxygenates in the oxygenate containing hydrocarbon stream may comprise alcohols, and the alcohols may be converted to olefins by dehydration of the alcohol by treatment with a dehydration catalyst. In an embodiment, treating the oxygenate containing hydrocarbon stream in olefin enrichment unit 100 may further include the removal of oxygenates and/or water from the oxygenate containing hydrocarbon stream (see, for example, FIG. 2). Various methods and techniques for removing oxygenates from hydrocarbon streams are disclosed in U.S. Pat. No. 6,743,962 to O'Rear et al., the disclosure of which is incorporated by reference herein in its entirety.

In an embodiment, the first hydrocarbon stream may comprise a $C_{8-}$ condensate. The $C_{8-}$ condensate may include LPG ($C_3$-$C_4$) components and ethylene. In a sub-embodiment, the $C_{8-}$ condensate may be derived from Fischer-Tropsch synthesis. In another sub-embodiment, the $C_{8-}$ condensate may be obtained by a coal liquefaction (coal-to-liquid (CTL)) process.

During an ionic liquid catalyzed hydrocarbon conversion process of the instant invention, the olefin enriched hydrocarbon stream may be fed from olefin enrichment unit 100 to hydrocarbon conversion unit 110. Hydrocarbon conversion unit 110 may also be referred to herein as a hydrocarbon conversion zone. In an embodiment, the olefin enriched hydrocarbon stream may typically comprise from about 1 to 90 wt % olefins, and often from about 5 to 60 wt % olefins. In an embodiment, the olefin enriched hydrocarbon stream may typically comprise less than about 0.5 wt % oxygenates, and often less than about 0.3 wt % oxygenates.

Prior to hydrocarbon conversion unit 110, the olefin enriched hydrocarbon stream may optionally be subjected to a hydroisomerization step to shift the position of the C=C bond(s) in the olefin molecule and/or to introduce branching into the carbon chain. By shifting the double bond position and inducing branching of the carbon chain, the boiling point distribution of distillate products of the invention may be modified.

In an embodiment, the olefin enriched hydrocarbon stream and the ionic liquid catalyst may be introduced into hydrocarbon conversion unit 110 via separate inlet ports (not shown). The olefin enriched hydrocarbon stream may be contacted with the ionic liquid catalyst in hydrocarbon conversion unit 110 under olefin oligomerization conditions to provide a first distillate enriched stream. In an embodiment, the ionic liquid catalyst may comprise a chloroaluminate ionic liquid. The feeds to hydrocarbon conversion unit 110 may further include a catalyst promoter, such as anhydrous HCl or an alkyl halide. In an embodiment, the catalyst promoter may comprise a $C_2$-$C_6$ alkyl chloride, such as n-butyl chloride or t-butyl chloride. Hydrocarbon conversion unit 110 may be vigorously mixed to promote contact between the olefin enriched hydrocarbon stream and the ionic liquid catalyst.

Hydrocarbon conversion conditions within hydrocarbon conversion unit 110 may be adjusted to optimize process performance for a particular hydrocarbon conversion process of the present invention. In an embodiment, the hydrocarbon conversion conditions comprise oligomerization conditions, such that olefins in the olefin enriched stream are oligomerized. In another embodiment, the hydrocarbon conversion conditions may comprise alkylation conditions, such that olefins in the olefin enriched stream may be alkylated by isoparaffins to provide an alkylate product. In yet another embodiment, the hydrocarbon conversion conditions may comprise both oligomerization conditions and alkylation conditions, such that oligomerization and alkylation may occur concurrently within hydrocarbon conversion unit 110.

According to an aspect of the present invention, at least one reaction condition or parameter of the hydrocarbon conversion zone may be adjusted to selectively promote either olefin oligomerization or alkylation reactions. In an embodiment, the reaction conditions may be selected such that olefin oligomerization reactions may be promoted relative to alkylation. As an example, at least one reaction condition of the hydrocarbon conversion zone may be adjusted to selectively promote olefin oligomerization, while at the same time olefin/isoparaffin alkylation reactions may be suppressed.

As non-limiting examples only, and while not being bound by theory, olefin oligomerization may be favored at the expense of alkylation by selecting a relatively high reaction temperature, by decreasing the relative amount of co-catalyst (e.g., HCl or alkyl halide) in hydrocarbon conversion unit 110, or by increasing the conjunct polymer content within hydrocarbon conversion unit 110. The conjunct polymer content may be controlled by adjusting the rate at which used ionic liquid catalyst is replenished with fresh ionic liquid catalyst, and/or by adjusting the rate of ionic liquid catalyst regeneration, as described hereinbelow.

During hydrocarbon conversion processes of the invention, hydrocarbon conversion unit 110 may contain a mixture comprising ionic liquid catalyst and a hydrocarbon phase. The hydrocarbon phase may comprise at least one hydrocarbon conversion product of the ionic liquid catalyzed reaction. In an embodiment, the ionic liquid catalyst may be separated from the hydrocarbon phase via a catalyst/hydrocarbon separator (not shown), wherein the hydrocarbon and ionic liquid catalyst phases may be allowed to settle under gravity, by using a coalescer, or by a combination thereof. The use of coalescers for liquid-liquid separations is disclosed in commonly assigned US Pub. No. 20100130800A1, the disclosure of which is incorporated by reference herein in its entirety.

The hydrocarbon phase may be greatly enriched in distillate material, e.g., in comparison with the olefin enriched hydrocarbon stream.

The hydrocarbon phase may be fed to dechlorination unit 170, while at least a portion of the ionic liquid phase may be recycled to hydrocarbon conversion unit 110. The hydrocarbon phase fed to dechlorination unit 170 may be referred to herein as a first distillate enriched stream, and the effluent from dechlorination unit 170 may be referred to herein as a dechlorinated distillate enriched stream. In an embodiment, the first distillate enriched stream may be hydrodechlorinated under hydrodechlorination conditions in the presence of hydrogen and a hydrodechlorination catalyst, substantially as described with reference to FIG. 3, infra. Dechlorination unit 170 may also serve to saturate any olefinic molecules in the first distillate enriched stream. In other embodiments, the first distillate enriched stream of the instant invention may be dechlorinated, for example, by hot caustic treatment, or by the adsorption of organochlorine species using a suitable adsorbent. The removal of organic halides from hydrocarbon materials is disclosed in commonly assigned U.S. Pat. No. 7,538,256, and US Pub. Nos. 20100147740A1 and 20100147746A1, the disclosure of each of which is incorporated by reference herein in its entirety.

With further reference to FIG. 1, at least one of a second hydrocarbon stream and a third hydrocarbon stream may be fed to hydroprocessing unit 120 to provide a second distillate enriched stream. Hydroprocessing unit 120 may also be referred to herein as a hydroprocessing zone. In an embodiment, hydroprocessing unit 120 may include at least one of a hydrocracking zone and a hydrotreating zone. At least one of the second hydrocarbon stream and the third hydrocarbon stream may undergo hydrocracking in hydroprocessing unit 120. In a sub-embodiment, the second hydrocarbon stream may undergo hydrotreating, while the third hydrocarbon stream may undergo hydrocracking. In another sub-embodiment, both the second and third hydrocarbon streams may undergo hydrocracking. In an embodiment, the second hydrocarbon stream may comprise a $C_{9+}$ condensate, while the third hydrocarbon stream may comprise Fischer-Tropsch wax (see, e.g., FIG. 3). In a sub-embodiment, the $C_{9+}$ condensate may be derived from Fischer-Tropsch synthesis.

The second distillate enriched stream may be fed, together with the dechlorinated distillate enriched stream, to first distillation unit 130 for the separation of a distillate product therefrom. An LPG product and a naphtha product may also be obtained via first distillation unit 130. The organic chloride content of each of the products from first distillation unit 130 will typically be sufficiently low to allow blending of such products into refinery streams. Typically, the organic chloride content of each of the products from first distillation unit 130 may be less than about 50 ppm, and often less than about 5 ppm.

Figure 3:
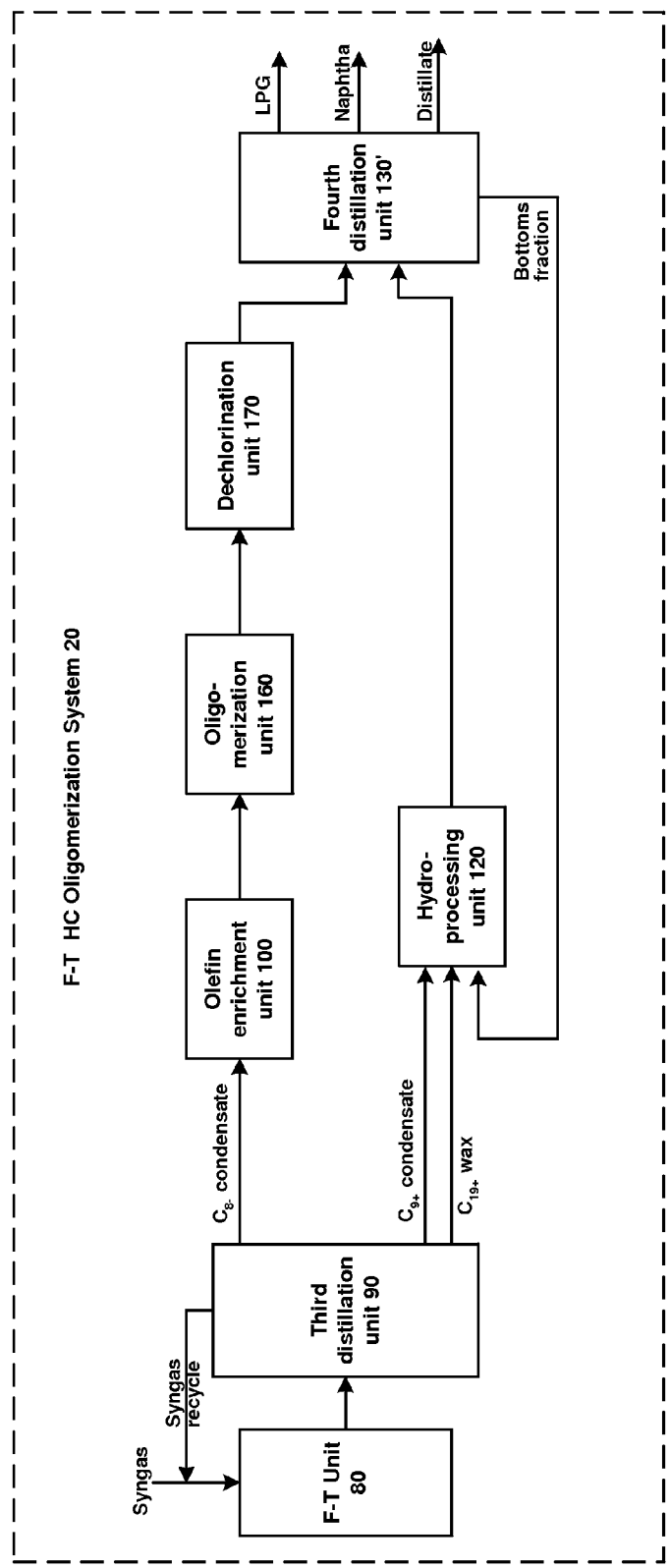
FIG. 3 represents a scheme for an ionic liquid catalyzed olefin oligomerization process, according to another embodiment of the present invention.

FIG. 3 represents a scheme for an ionic liquid catalyzed oligomerization process using a plurality of Fischer-Tropsch derived hydrocarbon streams, according to another embodiment of the present invention. As shown in FIG. 3, a Fischer-Tropsch hydrocarbon oligomerization system 20 may include a Fischer-Tropsch synthesis unit 80, a third distillation unit 90, an olefin enrichment unit 100, an oligomerization unit 160, a hydroprocessing unit 120, a dechlorination unit 170, and a fourth distillation unit 130'.

Synthesis gas (syngas) may be fed to Fischer-Tropsch unit 80 for Fischer-Tropsch hydrocarbon synthesis, as is well known in the art. The product(s) from Fischer-Tropsch synthesis unit 80 may be separated, e.g., via third distillation unit 90, into a plurality of Fischer-Tropsch derived hydrocarbon streams. In the embodiment of FIG. 3, a first Fischer-Tropsch hydrocarbon stream may comprise $C_{8-}$ Fischer-Tropsch condensate, which may include LPG (liquefied petroleum gas) as well as ethylene. A second Fischer-Tropsch hydrocarbon stream may comprise $C_{9+}$ (e.g., $C_9$-$C_{18}$) Fischer-Tropsch condensate, while a third Fischer-Tropsch derived hydrocarbon stream may comprise Fischer-Tropsch wax (e.g., $C_{19+}$ paraffins).

The first Fischer-Tropsch derived hydrocarbon stream may comprise substantial amounts of $C_2$-$C_8$ olefins. The first Fischer-Tropsch derived hydrocarbon stream may also comprise substantial quantities of oxygenates in addition to olefins. Ionic liquid catalysts may be susceptible to deactivation by oxygenates in the feed. In an embodiment, the oxygenates may be removed from the first Fischer-Tropsch hydrocarbon stream by treatment in olefin enrichment unit 100 to provide an olefin enriched hydrocarbon stream. Such treatment of the first Fischer-Tropsch hydrocarbon stream may be performed substantially as described herein with reference to FIG. 2, infra.

The olefin enriched hydrocarbon stream may be fed from olefin enrichment unit 100 to oligomerization unit 160. Oligomerization unit 160 may also be referred to herein as an oligomerization zone. The olefin enriched hydrocarbon stream may comprise $C_2$-$C_8$ olefins. Olefin oligomerization may be performed by contacting the olefin enriched hydrocarbon stream with an ionic liquid catalyst in oligomerization unit 160 under oligomerization conditions to provide a first distillate enriched stream comprising oligomeric material. In an embodiment, the first distillate enriched stream emanating from oligomerization unit 160 may comprise predominantly distillate range material.

In an embodiment, the ionic liquid catalyst in oligomerization unit 160 may comprise a chloroaluminate ionic liquid. The olefin enriched hydrocarbon stream may comprise isoparaffins, e.g., $C_4$-$C_8$ isoparaffins, in addition to olefins. In an embodiment, the reaction conditions within oligomerization unit 160 may allow both olefin oligomerization and alkylation to occur concurrently in the presence of a given ionic liquid catalyst.

According to one aspect of the present invention one or more reaction conditions or parameters within oligomerization unit 160 may be selected to promote olefin oligomerization. At the same time, the reaction conditions within oligomerization unit 160 may cause the alkylation of olefins with isoparaffins to be suppressed. While not being bound by theory, and as non-limiting examples only, olefin oligomerization may be favored at the expense of alkylation by selecting a relatively high reaction temperature, by decreasing the relative amount of co-catalyst (e.g., HCl or alkyl halide) in hydrocarbon conversion unit 110, and/or by increasing the conjunct polymer content within oligomerization unit 160. Conversely, alkylation may be favored by selecting a relatively low reaction temperature, by increasing the relative amount of co-catalyst (e.g., HCl or alkyl halide) in hydrocarbon conversion unit 110, and/or by decreasing the conjunct polymer concentration. During a single pass of the first hydrocarbon stream through oligomerization unit 160, typically at least about 70%, usually at least about 85%, and often at least about 95% of the olefins in the first hydrocarbon stream may be oligomerized following contact with the ionic liquid catalyst under suitable reaction conditions.

At least one of the second and third Fischer-Tropsch derived hydrocarbon streams (e.g., comprising $C_{9+}$ condensate and $C_{19+}$ wax, respectively) may be fed to hydroprocessing unit 120. Hydroprocessing unit 120 may also be referred to herein as a hydroprocessing zone. At least one of the second and third Fischer-Tropsch derived hydrocarbon streams may be contacted with a hydroprocessing catalyst under hydroprocessing conditions in the hydroprocessing zone to provide a second distillate enriched stream.

In an embodiment, the hydroprocessing zone may include a hydrocracking zone for hydrocracking at least one of the second and third Fischer-Tropsch derived hydrocarbon streams. In another embodiment, the hydroprocessing zone may include a hydrotreating zone for hydrotreating the second Fischer-Tropsch derived hydrocarbon stream. In another embodiment, the hydroprocessing zone may include both a hydrotreating zone and a hydrocracking zone. The second distillate enriched stream may be fed from the hydroprocessing zone to fourth distillation unit 130'.

The first distillate enriched stream from oligomerization unit 160 may be fed to dechlorination unit 170. Dechlorination unit 170 may also be referred to herein as a dechlorination zone. The first distillate enriched stream may include, e.g., as contaminants, one or more halogenated components, such as organochlorines, as well as olefins. In an embodiment, the first distillate enriched stream may be contacted with a hydrodechlorination catalyst in the presence of hydrogen in the dechlorination zone under hydrodechlorination conditions to remove the halogenated and olefinic components from the first distillate enriched stream. The hydrodechlorination catalyst may comprise an element selected from the group consisting of elements of Groups 6, 8, 9, 10, and 11 of the Periodic Table, and combinations thereof, present as metals, oxides, or sulfides.

The effluent from dechlorination unit 170 may be referred to as a dechlorinated distillate enriched stream. In an embodiment, a first chloride content of the first distillate enriched stream may be greater than 50 ppm, typically greater than about 200 ppm, and often greater than about 1000 ppm; while a second chloride content of the dechlorinated distillate enriched stream may be less than 50 ppm, typically less than about 10 ppm, and often less than about 5 ppm.

The dechlorinated distillate enriched stream may be fed to fourth distillation unit 130' together with the second distillate enriched stream from hydroprocessing unit 120, and a distillate product may be separated from at least one of the dechlorinated distillate enriched stream and the second distillate enriched stream. The distillate product may typically have a chloride content less than about 50 ppm, and often less than about 5 ppm. A naphtha product and an LPG product may also be separated via fourth distillation unit 130'. In an embodiment, the distillate product may comprise at least about 70 vol % of the distillation unit product stream. In comparison with conventional processes for upgrading Fischer-Tropsch derived hydrocarbons in the absence of ionic liquid catalyzed olefin oligomerization, the present invention may provide a substantial increase in the yield of total distillate, while the proportion of both naphtha and LPG products may be greatly decreased.

According to an aspect of the instant invention, a bottoms fraction may also be separated via fourth distillation unit 130'. In a sub-embodiment, the bottoms fraction may be recycled to hydroprocessing unit 120 to provide additional distillate enriched feed to fourth distillation unit 130'. Alternatively, the bottoms fraction may be collected separately for use in other processes, such as base oil production.

Reaction Conditions for Ionic Liquid Catalyzed Hydrocarbon Conversions

Due to the low solubility of hydrocarbons in ionic liquids, hydrocarbon conversion reactions in ionic liquids (including olefin oligomerization and isoparaffin/olefin alkylation reactions) are generally biphasic and occur at the interface in the liquid state. The volume of ionic liquid catalyst in the reactor may be typically in the range from about 1 to 70 vol %, and usually from about 4 to 50 vol %. Generally, vigorous mixing (e.g., stirring or Venturi nozzle dispensing) is used to ensure good contact between the reactants and the ionic liquid catalyst. The reaction temperature may be typically in the range from about −40° F. to +480° F., usually from about −4° F. to +210° F., and often from about +40° F. to +140° F. The reactor pressure may be in the range from atmospheric pressure to about 8000 kPa. Typically, the reactor pressure will be sufficient to keep the reactants in the liquid phase.

Residence time of reactants in the reactor may generally be in the range from a few seconds to hours, and usually from about 0.5 min to 60 min. Heat generated by the reaction may be dissipated using various means well known to the skilled artisan. The reaction product may be recycled to the reactor section to control the reactor temperature or to reduce the co-catalyst make-up rate.

With continued use, the ionic liquid catalyst may become partially deactivated or spent. In order to maintain the catalytic activity, at least a portion of the ionic liquid phase may be fed to a catalyst regeneration unit (not shown) for regeneration of the ionic liquid catalyst. As an example, the ionic liquid catalyst may be regenerated by treatment with a regeneration metal, such as Al metal, or by treatment of the ionic liquid catalyst in the presence of $H_2$ with a hydrogenation catalyst. Processes for the regeneration of ionic liquid catalyst are disclosed in the patent literature (see, for example, U.S. Pat. Nos. 7,732,364 and 7,674,739, the disclosures of which are incorporated by reference herein in their entirety).

Ionic liquid catalyst deactivation may be associated with the accumulation of conjunct polymer, which may be removed from the ionic liquid during catalyst regeneration. The rate of withdrawal of spent ionic liquid catalyst and concomitant replenishment with fresh ionic liquid, and/or the rate at which the used ionic liquid is fed to the catalyst regeneration unit may be controlled to adjust the reaction conditions within oligomerization unit 160, e.g., according to the target product(s).

Dechlorination of Ionic Liquid Derived Distillate Enriched Stream

In an embodiment of the present invention, the first distillate enriched stream, e.g., obtained from oligomerization unit 160, may typically comprise one or more halogenated components. As an example only, the first distillate enriched stream may have an organic chloride content generally greater than about 50 ppm, typically greater than about 200 ppm, and often greater than about 1000 ppm. In an embodiment, the first distillate enriched stream from hydrocarbon conversion unit 110 may have an organic chloride content generally in the range from about 50 ppm to 5000 ppm, typically from about 100 ppm to 4000 ppm, and often from about 200 ppm to 3000 ppm.

According to an aspect of the instant invention, the first distillate enriched stream may be fed to dechlorination unit 170 to provide a dechlorinated and saturated distillate enriched stream. Dechlorination unit 170 may also be referred to herein as a dechlorination zone. In an embodiment, the first distillate enriched stream may be dechlorinated by hot caustic treatment. In another embodiment, the first distillate enriched stream may be dechlorinated by adsorption of organochlorine species using an adsorbent such as zeolite 13×, alumina, clay, silica-alumina, and the like.

According to another embodiment of the instant invention, dechlorination unit 170 may comprise a hydrodechlorination unit or zone, and the first distillate enriched stream may be fed to the hydrodechlorination zone for hydrodechlorination and olefin saturation by contacting the first distillate enriched stream with a hydrodechlorination catalyst in the presence of hydrogen under hydrodechlorination conditions to provide a dechlorinated distillate enriched stream. The hydrodechlorination catalyst may comprise an element selected from the group consisting of elements of Groups 6, 8, 9, 10, and 11 of the Periodic Table, and combinations thereof, present as metals, oxides, or sulfides. In a sub-embodiment, the hydrodechlorination catalyst may comprise an element selected from Pd, Pt, Au, Ni, Co, Mo, and W, and their mixtures, present as metals, oxides, or sulfides.

The hydrodechlorination catalyst may further comprise a support. The support may comprise an inorganic porous material, such as a refractory oxide, or activated carbon. In an embodiment, the hydrodechlorination catalyst may comprise a noble metal on a refractory oxide support. Examples of refractory oxide support materials include alumina, silica, titania, alumina-silica, and zirconia, or the like, and combinations thereof. In a sub-embodiment, the hydrodechlorination catalyst may comprise Pd, or Pt, or a combination of Pd and Pt, e.g., in the range from about 0.05 to 3.0 wt % Pd, or Pt, or mixtures thereof.

The hydrodechlorination conditions within the hydrodechlorination zone may comprise a reaction temperature generally in the range from about 300° F. to 750° F., and typically from about 400° F. to 650° F. The hydrodechlorination conditions may include a reaction pressure generally in the range from about 100 to 5000 psig, and typically from about 200 to 2000 psig. A liquid hourly space velocity (LHSV) feed rate to the hydrodechlorination zone may be generally in the range from about 0.1 to 50 $hr^{-1}$, and typically from about 0.2 to 10 $hr^{-1}$. A hydrogen supply to the hydrodechlorination zone may be generally in the range from about 50 to 8000 standard cubic feet per barrel (SCFB) of the first distillate enriched stream, and typically from about 100 to 5000 SCFB.

The first distillate enriched stream fed to dechlorination unit 170 may typically have a much higher chloride content as compared with that of the dechlorinated distillate enriched stream obtained from dechlorination unit 170. In an embodiment, a first chloride content of the first distillate enriched stream fed to dechlorination unit 170 may be greater than about 50 ppm. In an embodiment, the first distillate enriched stream fed to dechlorination unit 170 may have an organic chloride content generally in the range from about 50 ppm to 5000 ppm, typically from about 100 ppm to 4000 ppm, and often from about 200 ppm to 3000 ppm.

In contrast, the organic chloride content of a dechlorinated distillate enriched stream obtained from dechlorination unit 170 may be greatly decreased as compared with that of the first distillate enriched stream. Typically, the dechlorinated distillate enriched stream may have a second chloride content less than 50 ppm, usually less than about 10 ppm, and often equal to or less than about 5 ppm. Analogous results will be obtained when the present invention is practiced using ionic liquid catalyst systems based on halides other than chlorides.

The first distillate enriched stream fed to dechlorination unit 170 may typically have an olefin content in the range from about 1 to 10 wt %. After hydrodechlorination, the olefin content may be decreased to less than 1 wt %, and usually less than 0.5 wt %.

Feedstocks for Hydrocarbon Conversion Processes

In an embodiment, feeds for the present invention may comprise various hydrocarbon streams containing $C_2$-$C_8$ olefins, such as those in a petroleum refinery, a gas-to-liquid conversion plant, or a coal-to-liquid conversion plant, including streams from Fischer-Tropsch synthesis units, naphtha crackers, middle distillate crackers or wax crackers, as well as FCC offgas, FCC light naphtha, coker offgas, coker naphtha, and the like. Some such streams may contain significant amounts of oxygenates and/or isoparaffin(s) in addition to olefin(s). In a sub-embodiment, an oxygenate containing hydrocarbon stream useful in practicing the present invention may comprise Fischer-Tropsch condensate.

As a non-limiting example, an oxygenated olefin containing hydrocarbon stream useful in practicing the present invention may typically comprise from about 1 to 90 wt % olefins, and from about 0.5 to 30 wt % oxygenates. The oxygenate components of the oxygenated olefin containing hydrocarbon stream may comprise from about 0.1 to 30 wt % $C_1$-$C_8$ alkanols and $C_1$-$C_8$ carboxylic acids. Such streams may be fed to an olefin enrichment unit or zone to provide an olefin enriched hydrocarbon stream (see, e.g., FIG. 2).

In an embodiment, an oxygenate containing hydrocarbon stream may contain two or more olefins selected from ethylene, propylene, butylenes, pentenes, and up to $C_8$ olefins. The oxygenate containing hydrocarbon stream may comprise alpha olefins and/or internal olefins (i.e., having an internal double bond). The olefins may be either straight chain, or branched, or a mixture of the two. In an embodiment of the present invention, the oxygenate containing hydrocarbon stream may comprise a mixture of mostly linear olefins from $C_2$ to about $C_8$.

Olefin Enrichment of Oxygenate Containing Hydrocarbon Streams

Figure 2:
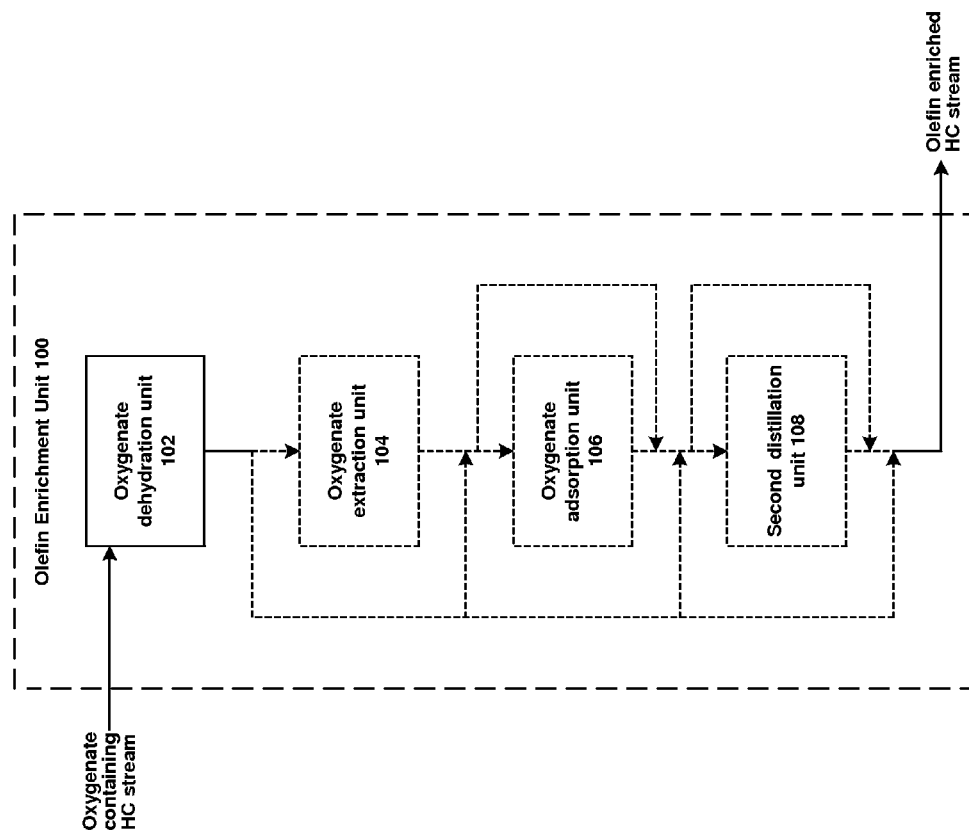
FIG. 2 represents a scheme for an olefin enrichment process using an oxygenate containing hydrocarbon feed, according to an aspect of the process of FIG. 1.

FIG. 2 represents a scheme for olefin enrichment of an oxygenate containing hydrocarbon feed, according to an aspect of the process of FIG. 1. The oxygenate containing hydrocarbon stream may be, for example, any of various hydrocarbon streams, which contain significant or substantial amounts of oxygenates, in a petroleum refinery, a gas-to-liquid conversion plant, or a coal-to-liquid conversion plant, and the like. In an embodiment, the oxygenate containing hydrocarbon stream may comprise a Fischer-Tropsch condensate.

With further reference to FIG. 2, olefin enrichment unit 100 for treating an oxygenate containing hydrocarbon stream may include an oxygenate dehydration unit 102. Oxygenate dehydration unit 102 may also be referred to herein as a dehydration zone. Oxygenate dehydration unit 102 may include a dehydration catalyst. In an embodiment, a process for treating an oxygenate containing hydrocarbon stream may comprise dehydrating oxygenates in the oxygenate containing hydrocarbon stream by contacting the oxygenate containing hydrocarbon stream with the dehydration catalyst in the dehydration zone under dehydration conditions.

In an embodiment, oxygenates present in the oxygenate containing hydrocarbon stream may comprise predominantly alcohols. The alcohols may be converted to olefins by contacting the oxygenate containing hydrocarbon stream with the dehydration catalyst to provide an olefin enriched hydrocarbon stream. The dehydration conditions for dehydrating oxygenates in the oxygenate containing hydrocarbon stream may include a temperature in the range from about 400° F. to 800° F., a pressure in the range from about 10 to 5000 psig, and a liquid hourly space velocity (LHSV) feed rate in the range from about 0.1 to 50 $hr^{-1}$.

In an embodiment, the dehydration catalyst may be selected from the group consisting of alumina and amorphous silica-alumina. In a sub-embodiment, the dehydration catalyst may comprise alumina doped with an element selected from the group consisting of phosphorus, boron, fluorine, zirconium, titanium, gallium, and combinations thereof. In another sub-embodiment, the dehydration catalyst may comprise amorphous silica-alumina doped with an element selected from the group consisting of phosphorus, boron, fluorine, zirconium, titanium, gallium, and combinations thereof.

With still further reference to FIG. 2, olefin enrichment unit 100 may optionally further include one or more of an oxygenate extraction unit 104, an oxygenate adsorption unit 106, and a second distillation unit 108. In an embodiment, the treatment of an oxygenate containing hydrocarbon stream according to the present invention may optionally include the use of oxygenate extraction unit 104 for extracting or washing the hydrocarbon stream with an aqueous medium, whereby residual oxygenates may be removed from the hydrocarbon stream exiting dehydration unit 102.

In an embodiment, an olefin enrichment process of the present invention may optionally further include contacting the hydrocarbon stream with an adsorbent in oxygenate adsorption unit 106, whereby residual oxygenates and/or water may be removed from the hydrocarbon stream. In a sub-embodiment, the adsorbent may comprise a molecular sieve, such as zeolite 13×. Zeolites and molecular sieves are well known in the art (see, for example, *Zeolites in Industrial Separation and Catalysis*, By Santi Kulprathipanja, Pub. Wiley-VCH, 2010). In an embodiment, the hydrocarbon stream may be fed to adsorption unit 106 from oxygenate extraction unit 104. Alternatively, oxygenate extraction unit 104 may be omitted or bypassed, and the hydrocarbon stream may be fed to adsorption unit 106 directly from dehydration unit 102.

In yet another embodiment of the present invention, olefin enrichment unit 100 may optionally still further include a second distillation unit 108. As a non-limiting example, second distillation unit 108 may be used to remove a heavy fraction from the hydrocarbon stream prior to ionic liquid catalyzed hydrocarbon conversion of the olefin enriched hydrocarbon stream.

The following examples are illustrative of the present invention, but are not intended to limit the invention in any way beyond what is contained in the claims which follow.

EXAMPLES

Comparative Example A

Product Yield from a Conventional Integrated Fischer-Tropsch Process with Hydroproprocessing A typical Fischer-Tropsch (F-T) process using $Co/Al_2O_3$ catalyst produces approximately 50 vol % condensate ($C_2$-$C_{18}$), of which about one half is light condensate ($C_{8-}$). A typical F-T derived light condensate has a composition as shown in Table 1:

TABLE 1

Typical composition of F-T derived light condensate

| Composition | Approximate vol % | Olefin Content in the Fraction |
|---|---|---|
| $C_{2-}$ | <5 | * |
| $C_3$-$C_4$ | 20 | 67% |
| $C_5$-$C_6$ | 40 | 50% |
| $C_7$-$C_8$ | 40 | 40% |

* the olefin content of the $C_{2-}$ fraction is highly dependent on the proportion of methane in the fraction.

A hypothetical F-T plant with 100,000 barrel-per-day capacity with a hydrotreating unit to treat the condensate as described above and an extinction-recycle hydrocracking unit to convert the F-T wax product into distillate provides product yields as shown in Table 2:

TABLE 2

Typical product yield from a conventional integrated Fischer-Tropsch process

| Product Stream | Product Volume, BPD |
|---|---|
| LPG | 5,000 |
| Naphtha | 20,000 |
| Distillate | 75,000 |
| Total | 100,000 |

Example 1

Product Yield from an Integrated Fischer-Tropsch Process with Hydroproprocessing and Ionic Liquid Catalyzed Condensate Upgrading (Invention)

An integrated Fischer-Tropsch process is performed generally as for Comparative Example A, but with the inclusion of an olefin oligomerization unit for upgrading the light condensate fraction. The light condensate upgrading is performed in a continuously stirred tank reactor using ionic liquid catalyst with vigorous stirring in the presence of a small amount of anhydrous t-butyl chloride. The average residence time (combined volume of feed and catalyst) is about 15 minutes, the outlet pressure is maintained at about 200 psig, and the reactor temperature is about 100° F. The reactor effluent is separated using a coalescing separator into a hydrocarbon phase and an ionic liquid catalyst phase. SimDist analysis shows about 90% conversion of olefins in the light condensate feed to distillate boiling range product (250° F.+).

By including an olefin oligomerization unit for upgrading the light condensate fraction according to the instant invention, the overall product yield is shifted as shown in Table 3.

TABLE 3

Product yield from an integrated process of the present invention

| Product Stream | Product Volume, BPD † | % Change from the Base Case (Comparative Example A) |
|---|---|---|
| LPG | 2,750 | −55% |
| Naphtha, $C_5$ - 280° F. | 12,100 | −40% |
| Distillate, 280° F. - EP | 83,000 | +11% |
| Total | 97,850 | −2% |

† Product volume is calculated on the basis of 90% conversion of olefins in the light condensate feed to distillate boiling range product.

Processes of the invention decrease the LPG yield by 55% and decrease the naphtha yield by about 40%, as compared with a typical integrated F-T process of the prior art. LPG and naphtha are generally less desirable product streams derived from the F-T or CTL processes. By converting the less desirable light condensate to distillate according to processes of the invention, the total distillate yield increases by about 11%. Due to the density difference, the overall product volume decreases by about 2 vol %.

Certain features of the various embodiments may be combined with features of other embodiments to provide further embodiments of the present invention in addition to those embodiments specifically described or shown as such.

There are numerous variations on the present invention which are possible in light of the teachings described herein. It is therefore understood that within the scope of the following claims, the invention may be practiced otherwise than as specifically described or exemplified herein.

What is claimed is:

1. A process for increasing distillate yield, comprising:
  a) separating a product from a Fischer-Tropsch unit into:
    i) a first hydrocarbon stream comprising C2-C8 olefins; and
    ii) a second hydrocarbon stream comprising a C9+ Fischer-Tropsch condensate;
  b) contacting the first hydrocarbon stream comprising $C_2$-$C_8$ olefins with an ionic liquid catalyst and an alkyl halide co-catalyst in a hydrocarbon conversion zone under oligomerization conditions to oligomerize the olefins and to provide a first distillate enriched stream including one or more halogenated components; and
  c) removing the one or more halogenated components from the first distillate enriched stream to provide a dechlorinated distillate enriched stream;
  d) providing at least one of the second hydrocarbon stream comprising the C9+ Fischer-Tropsch condensate and a third hydrocarbon stream comprising C19+ paraffins; and
  e) contacting at least one of the second hydrocarbon stream and the third hydrocarbon stream with a hydroprocessing catalyst in a hydroprocessing zone under hydroprocessing conditions to provide a second distillate enriched stream; wherein the hydroprocessing zone includes a hydrocracking zone.

2. The process according to claim 1, wherein step c) comprises contacting the first distillate enriched stream with a hydrodechlorination catalyst in the presence of hydrogen in a hydrodechlorination zone under hydrodechlorination conditions.

3. The process according to claim 1, wherein the first hydrocarbon stream further comprises isoparaffins, and the process further comprises:
  d) concurrently with step b), contacting the first hydrocarbon stream with the ionic liquid catalyst in the hydrocarbon conversion zone under alkylation conditions to alkylate the olefins with the isoparaffins.

4. The process according to claim 3, wherein at least one reaction condition of the hydrocarbon conversion zone is adjusted to selectively promote the alkylation of the olefins with the isoparaffins.

5. The process according to claim 1, wherein at least one reaction condition of the hydrocarbon conversion zone is adjusted to selectively promote the oligomerization of the olefins.

6. The process according to claim 5, wherein at least about 70% of the olefins in the first hydrocarbon stream are oligomerized.

7. The process according to claim 1, wherein a first chloride content of the first distillate enriched stream is greater than 50 ppm, and a second chloride content of the dechlorinated distillate enriched stream is less than 50 ppm.

8. The process according to claim 1, further comprising:
  f) feeding the second distillate enriched stream and the dechlorinated distillate enriched stream to a distillation unit; and
  g) via the distillation unit, separating a distillate product from at least one of the dechlorinated distillate enriched stream and the second distillate enriched stream.

9. The process according to claim 8, wherein the distillate product has a chloride content less than about 10 ppm.

10. The process according to claim 8, wherein the distillate product comprises at least about 70 vol % of a distillation unit product stream.

11. The process according to claim 1, wherein the second hydrocarbon stream comprises a $C_9$-$C_{18}$ Fischer-Tropsch condensate, and additionally comprises f) hydrotreating the $C_9$-$C_{18}$ Fischer-Tropsch condensate to provide at least a portion of the second distillate enriched stream.

12. The process according to claim 11, wherein the third hydrocarbon stream comprises a Fischer-Tropsch wax, and step e) comprises hydrocracking the Fischer-Tropsch wax to provide at least a portion of the second distillate enriched stream.

13. The process according to claim 8, further comprising:
i) via the distillation unit, separating a bottoms fraction from at least one of the dechlorinated distillate enriched stream and the second distillate enriched stream;
j) recycling the bottoms fraction to the hydroprocessing zone; and
k) via the hydroprocessing zone, hydrocracking the bottoms fraction to provide a portion of the second distillate enriched stream.

14. The process of claim 1, wherein a yield of LPG and a yield of naphtha are decreased compared to an integrated Fischer-Tropsch process with hydroprocessing and without contacting the first hydrocarbon stream comprising $C_2$-$C_8$ olefins with the ionic liquid catalyst and the alkyl halide co-catalyst in the hydrocarbon conversion zone under oligomerization conditions.

15. The process of claim 1, additionally comprising decreasing a relative amount of the alkyl halide co-catalyst in the hydrocarbon conversion zone to cause an alkylation to be suppressed.

16. The process of claim 1, additionally comprising increasing a relative amount of the alkyl halide co-catalyst in the hydrocarbon conversion zone to favor an alkylation.

17. A process for increasing distillate yield, comprising:
a) separating a product from a Fischer-Tropsch unit into:
i) a first Fischer-Tropsch derived hydrocarbon stream, comprising a C8- Fischer-Tropsch condensate comprising oxygenates; and
ii) a second Fischer-Tropsch derived hydrocarbon stream, comprising a C9+Fischer-Tropsch condensate;
b) contacting the C8- Fischer-Tropsch condensate comprising oxygenates with a dehydration catalyst in a dehydration zone under oxygenate dehydrating conditions to convert at least a portion of the oxygenates in the C8- Fischer-Tropsch condensate to olefins and to provide an olefin enriched Fischer-Tropsch condensate;
c) contacting the olefin enriched Fischer-Tropsch condensate with an ionic liquid catalyst and an alkyl halide co-catalyst in an oligomerization zone under oligomerization conditions to oligomerize the olefins and to provide a first distillate enriched stream including one or more halogenated components;
d) contacting the first distillate enriched stream with a hydrodechlorination catalyst in the presence of hydrogen in a hydrodechlorination zone under hydrodechlorination conditions to provide a dechlorinated distillate enriched stream;
e) contacting the second Fischer-Tropsch derived hydrocarbon stream, comprising a C9+ Fischer-Tropsch condensate, and a third Fischer-Tropsch derived hydrocarbon stream comprising Fischer-Tropsch wax with a hydroprocessing catalyst in a hydroprocessing zone under hydroprocessing conditions to provide a second distillate enriched stream; wherein the hydroprocessing zone includes a hydrocracking zone;
f) feeding the second distillate enriched stream and the dechlorinated distillate enriched stream to a distillation unit; and
g) via the distillation unit, separating a distillate product from at least one of the dechlorinated distillate enriched stream and the second distillate enriched stream.

18. The process according to claim 17, wherein step e) comprises contacting each of the second Fischer-Tropsch derived hydrocarbon stream and the third Fischer-Tropsch derived hydrocarbon stream with the hydroprocessing catalyst in the hydroprocessing zone under hydroprocessing conditions, wherein the second Fischer-Tropsch derived hydrocarbon stream comprises a $C_9$-$C_{18}$ Fischer-Tropsch condensate, and the third Fischer-Tropsch derived hydrocarbon stream comprises C19+ paraffins.

19. The process according to claim 17, additionally comprising:
h) via the distillation unit, separating a bottoms fraction from at least one of the dechlorinated distillate enriched stream and the second distillate enriched stream;
i) recycling the bottoms fraction to the hydroprocessing zone; and
j) via the hydroprocessing zone, hydrocracking the bottoms fraction to provide a portion of the second distillate enriched stream.

20. The process according to claim 17, additionally comprising separating a syngas from the product from a Fischer-Tropsch unit and recycling the syngas to the Fischer-Tropsch unit.

21. The process according to claim 17, wherein a rate of withdrawal of a spent ionic liquid catalyst and concomitant replenishment with a fresh ionic liquid is controlled to adjust reaction conditions within the oligomerization zone.

22. The process according to claim 17, wherein a rate at which a used ionic liquid is fed to a catalyst regeneration unit is controlled to adjust the reaction conditions within the oligomerization zone.

23. The process according to claim 17, wherein the hydrodechlorination catalyst comprises an element selected from the group consisting of elements of Groups 6, 8, 9, 10, and 11 of the Periodic Table, and combinations thereof, present as metals, oxides, or sulfides.

24. The process of claim 17, wherein a yield of LPG and a yield of naphtha are decreased compared to an integrated Fischer-Tropsch process with hydroprocessing and without contacting the olefin enriched Fischer-Tropsch condensate with the ionic liquid catalyst and the alkyl halide co-catalyst in the oligomerization zone under oligomerization conditions.

25. The process of claim 17, additionally comprising decreasing a relative amount of the alkyl halide co-catalyst in the oligomerization zone to cause an alkylation to be suppressed.

26. The process of claim 17, additionally comprising increasing a relative amount of the alkyl halide co-catalyst in the oligomerization zone to favor an alkylation.

* * * * *